United States Patent [19]

Farinelli, Jr.

[11] Patent Number: 5,483,371
[45] Date of Patent: Jan. 9, 1996

[54] LIGHTWAVE DISTRIBUTION SYSTEM FOR AUDIO AND VIDEO SERVICES AND TERMINAL EQUIPMENT THEREFOR

[75] Inventor: Robert P. Farinelli, Jr., Lexington, Ky.

[73] Assignee: Square D Company, Palatine, Ill.

[21] Appl. No.: 134,768

[22] Filed: Oct. 8, 1993

[51] Int. Cl.[6] .................................................. H04B 10/24
[52] U.S. Cl. ........................................................... 359/146
[58] Field of Search ................................. 359/125, 118, 359/126, 137, 143, 145, 146, 147; 381/80, 81

[56] References Cited

U.S. PATENT DOCUMENTS

| | | | |
|---|---|---|---|
| 4,891,694 | 1/1990 | Way | 359/125 |
| 4,920,570 | 4/1990 | West | 381/81 |
| 5,072,297 | 12/1991 | Kanazawa | 358/143 |
| 5,313,524 | 5/1994 | Van Halle | 381/80 |
| 5,329,371 | 7/1994 | Ueno | 381/81 |

FOREIGN PATENT DOCUMENTS

| | | | |
|---|---|---|---|
| 9109478 | 6/1991 | WIPO | 359/118 |
| 2012606 | 7/1992 | WIPO | 381/81 |

OTHER PUBLICATIONS

Kawahata, "The HI-OVIS Optical Communication System", Conference; Proceedings of the 9th European Microwave Conference, 17–20 Sep. 1979 pp. 83–98.

*Primary Examiner*—Leslie Pascal
*Attorney, Agent, or Firm*—Kareem M. Irfan

[57] ABSTRACT

The present invention provides a distribution system for audio and video services from a centralized source using lightwave signals generated from terminal equipment through an optical carrier to multiple locations in a facility. The terminal equipment reversibly convert audio, video, and control signals from electrical into lightwave signals. The terminal equipment also provide for electrical output at the remote locations with the appropriate format for various audio and video speakers and displays. A controller selects and converts audio communication signal into a standard audio format and directs the signal to the desired remote location in response to the control signal.

28 Claims, 3 Drawing Sheets

LIGHTWAVE DISTRIBUTION SYSTEM FOR AUDIO AND VIDEO SERVICES AND TERMINAL EQUIPMENT THEREFOR

RELATED APPLICATIONS

Related U.S. Pat. No. 5,131,048 issued on Jul. 14, 1992, and identified by Assignee's Docket No. DL-57 discloses one class of audio distribution systems which is suitable for use with the present application and co-pending U.S. application Ser. No. 07/811,780 filed on Dec. 20, 1992, as Assignee's Docket No. DL-44-2 discloses a communication and energy management system which is suitable for use with the present application. The entire teaching and disclosure of this patent and co-pending application is incorporated herein by reference.

FIELD OF THE INVENTION

The present invention relates generally to audio and video distribution systems and, more particularly, to distributing audio and video services from a centralized source using lightwave signals generated from terminal equipment through an optical carrier to multiple locations in a facility.

BACKGROUND OF THE INVENTION

There is an increasing marketplace demand for low cost, high quality systems for distributing audio and video signals from a centralized source or service entrance. There is a particular need for using these distribution systems in residential and commercial applications to display entertainment and informational data services at various locations throughout a home or office.

The demand is present not only in new construction but also in retrofitting existing facilities with technologically advanced services and display equipment. Installing a system to distribute signals from a centralized source to multiple remote locations in an existing facility raises a number of problems. Keeping the costs of installation affordable requires working within the existing structural confines. Still, the installation must be aesthetically-pleasing and use the space available in an efficient manner.

Besides installation, there are other problems that the distribution system must overcome regardless of the facility. Ideally, the system must be able to distribute not only audio and video signals, but also a control signal. The control signal allows access to the centralized source from any of the remote locations in the facility. Besides transmitting different types of signals, the system must have the capability of handling multiple channels of the same signal type.

The various distribution systems which are based on wire technologies have failed to obviate these problems. The inherently smaller size of optical carriers provides an advantage over the problems caused by installing cables or wires through a facility.

Some prior art systems are available for distributing either audio or video signals over optical fibers. In frequency modulated (FM) systems, the coding is dependent on the time variations between peaks in the waveform, which also allows for higher levels of noise and distortion without depletion of signaling information. However, each video channel consumes about 30 mHz per channel and requires automatic gain control, demodulation, and then, conversion to an Amplitude Modulated (AM) signal for use with display monitors. The additional circuitry increases the equipment cost dramatically.

A broadband vestigial sideband AM system for video consumes only about 8 mMz per channel and requires no conversion for use with a display monitor. Noise and distortion from the equipment, however, directly affect the amplitude of any signals in a similar frequency range. Therefore, the AM transmission mode is more susceptible to noise and nonlinear channel distortions than the FM mode. These factors have limited the use of AM as a distribution format to transporting large numbers of channels such as the interconnecting of headends to hubs in cable television systems or a broadband local area network extension via very expensive distributed feedback laser diodes and single mode fibers.

A need remains for an affordable, reliable distribution system for audio and video signals for the home or office. The system must be able to control the distribution of the signals from a centralized source to multiple remote locations. The system must transmit signals of different types as well as multiple channels of the same signal type.

SUMMARY OF THE INVENTION

In accordance with the present invention there is provided a distribution system for user access and control of communication signals at various locations within a facility from audio and video sources external to the system. The system includes a first converting means for receiving at least one communication signal having an audio or video portion or both, for converting the communication signal into a first lightwave signal, for receiving a second lightwave signal, and for converting the second lightwave signal into a control signal. The system also includes a second converting means for converting the first lightwave signal into the communication signal, for accessing the communication signal at each of the locations distributed throughout the facility remote to the first converting means, for receiving the control signal at one of the remote locations, and for converting the control signal into the second lightwave signal. An optical carrier optically connects the first and second converting means and carries the first and second lightwave signals therebetween. The system also provides means for controlling the communication signal in response to the control signal. The controlling means electrically connects to the first converting means for receiving the control signal therefrom.

The present invention provides terminal equipment such as a transceiver for a centralized source within a facility. The transceiver provides a user access and control of communication signals transmitted through an optical carrier to remote locations within the facility. The transceiver includes a housing having openings therein for electrical and optical terminal connections. Means for receiving at least one communication signal having an audio or video portion or both, for converting the communication signal into a first lightwave signal, for receiving a second lightwave signal, and for converting the second lightwave signal into a control signal are also included. There is at least one optical terminal adapted for connection to the optical carrier. The optical terminal transmits the first lightwave signal and receives the second lightwave signal. The transceiver includes an electrical input terminal adapted for receiving each communication signal and an electrical output terminal for outputting the control signal.

Another terminal equipment device provided by the present invention is a transceiver for remote locations within a facility which provides a user access and control of communication signals from a centralized source. The transceiver includes a housing having openings therein for electrical and optical terminals. Means for converting a first lightwave signal into at least one communication signal having an audio or video portion or both, for accessing each communication signal at the remote location, for receiving a control signal at the remote location, and for converting the control signal into a second lightwave signal are also included. There is at least one optical terminal adapted for connection to the optical carrier. The optical terminal transmits the second lightwave signal and receives the first lightwave signal. The transceiver also includes an electrical output terminal adapted for outputting each communication signal and an input terminal for receiving the control signal.

The present invention also includes a controller for providing a user access and control of communication signals at various locations within a facility from audio sources external to the controller. The controller includes a plurality of electrical inputs adapted to receive a plurality of audio communication signals and a control signal. An encoder converts one audio communication signal into a standard audio format. A plurality of electrical outputs electrically transmit the formatted audio communication signal. The controller also includes means for electrically directing the formatted audio communication signal to the selected electrical output in response to the control signal.

Accordingly, an object of the present invention is to provide a distribution system for high quality audio and video signals which is inexpensive and reliable.

Another object of the present invention is to provide a distribution system using an optical carrier for audio and video signals which is easy and inexpensive to aesthetically install in either new or existing, residential and commercial facilities.

A further object is to provide an inventive distribution system which provides access and control of audio and video signals at multiple remote locations within a facility from a centralized source.

Yet another object of the present invention is to provide a distribution system which is capable of transmitting different types of signals such as for audio, video, and infra-red and multiple channels of the same type of signal.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 8A is a circuit diagram used in a zone transceiver which illustrates a preferred embodiment for converting an infra-red signal into a second lightwave signal; and FIG. 8B is a modular circuit diagram used in a zone transceiver which illustrates a preferred embodiment for converting a first lightwave signal into a video modulation signal, a digital audio signal, a linelevel-format analog audio signal and a speaker-format analog audio signal.

DETAILED DESCRIPTION

The present invention includes a distribution system which provides a user access and control of communication signals at various remote locations within a residence, commercial office or other facility. The communication signals distributed include audio and video signals or both which are generated external to the system and serviced to the facility.

Figure 1:
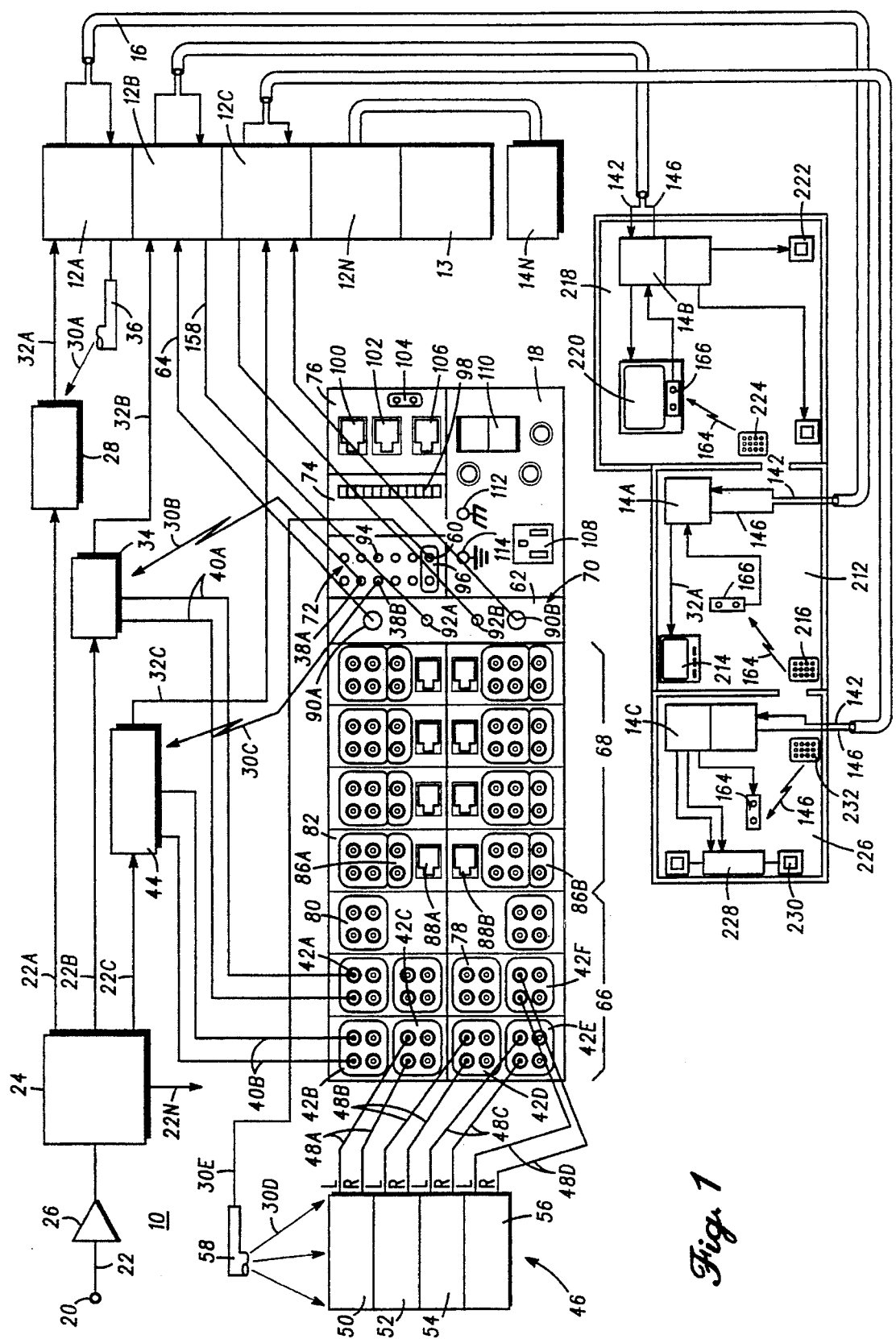
FIG. 1 is a diagram of an embodiment of the present invention illustrating a distribution system for audio and video services using optical devices.

Referring to FIG. 1, one embodiment of a distribution system 10 is provided which includes a plurality of first or source transceivers 12A, 12B, 12C, through 12N, a plurality of corresponding second or zone transceivers 14A, 14B, 14C, through 14N, an optical carrier 16, and a controller 18. Each source transceiver like 12A is located near the centralized source of the communication signals distributed by the system 10 and is electrically connected to a power supply 13. Each corresponding zone transceiver like 14A is located at the remote location or predetermined zone area in the facility. One zone transceiver like 14A is preferably located at each remote location in which it is desired to have access and control over the distributed communication signals.

A first communication signal source 20 external to the system 10 provides a first communication signal 22 including a video or audio component or both for distribution in the facility. Preferably, the first communication signal source 20 is a cable television service. A satellite dish or off-air antenna are examples of other communication signal sources. A closed-circuit video camera, or a pre-recorded source like a video cassette recorder or video disk player are other communication signal sources used with the invention. A hook-up to a cable service will be used for the purpose of illustrating the first communication signal source 20 in the present invention.

The first communication signal 22 from the external cable service 20 is electrically connected by coaxial cable to the input side of a splitter 24. Depending on the number of devices using the output of the splitter 24, an amplifier 26 is connected to the splitter 24 to restore signal level lost by the splitting of the first communication signal 22.

The first communication signal 22 is distributed through the splitter 24 to a number of different types of audio-video converter devices by split first communication signals 22A, 22B, 22C, and 22N. A cable converter 28 is an example of such an audio-video device. Preferably, there is one cable converter 28 corresponding to each source transceiver like 12A. As will be described herein, when every remote location in the facility serviced by a source and zone transceiver pair 12A and 14A has a dedicated cable converter 28, each remote location can view a program selected independently of the other remote locations.

The cable converter 28 receives the split first communication signal 22A which is a broadband, multi-channel video signal from the external cable service 20. The cable converter 28 receives a control signal 30A from the user through an infra-red (IR) emitter 36 electrically connected to the source transceiver 12A to select a particular channel. The cable converter 28 subsequently outputs an AM video modulation signal 32A as channel 3 or 4 having a bandwidth of about 6 MHz centered at 57 MHz which carries the selected channel. Usually, some of the channels on the cable service are designated as premium channels and are scrambled to prevent unauthorized access. In this case, the cable converter 28 also decodes the scrambled channels if authorization is Granted. The AM video modulation signal 32A outputed from the cable converter 28 is electrically transmitted to the source transceiver 12A.

An example of another audio-video converter device which receives the first communication signal 22 via electrical connection to the splitter 24 is a video tuner 34. The video tuner 34 receives the split first communication signal 22B which is a broadband, multi-channel video signal. The video tuner 34 receives a second control signal 30B from the user through an electrical connection to an IR output port 38A of the controller 18 to select a particular channel. The video tuner 34 subsequently outputs a channel 3 or 4 AM video modulation signal 32B having a bandwidth of about 6 MHz which carries the selected channel and left and right audio signals 40A. The AM video modulation signal 32B outputed from the video tuner 34 is electrically transmitted to the source transceiver 12B. The left and right audio signals 40A are electrically transmitted to a first plurality of audio input ports 42A of the controller 18.

A third example of an audio-video converter device which receives the first communication signal 22 via electrical connection to the splitter 24 is a cable-ready video cassette recorder (VCR) 44. The VCR 44 receives the split first communication signal 22C which is a broadband, multichannel video signal. The VCR 44 receives a third control signal 30C from the user through an electrical connection to an IR output port 38B of the controller 18 to select a particular channel. The VCR 44 subsequently outputs a channel 3 or 4 AM video modulation signal 32C and left and right audio signals 40B. The AM video modulation signal 32A has a bandwidth of about 6 MHz and carries the selected channel. The AM video modulation signal 32C outputed from the VCR 44 is electrically transmitted to the source transceiver 12C. The left and right audio signals 40B are electrically transmitted to a second plurality of audio input ports 42B of the controller 18.

Preferably, there is a second communication signal source 46 external to the system 10 which provides a second communication signal, collectively referred to as numeral 48, which has an audio signal for distribution in the facility. The second communication signal source 46 is illustrated as an audio rack containing a plurality audio equipment such as, but not limited to, a compact disk player 50, an AM/FM stereo receiver 52, a tape deck 54, and a record turntable 56. The audio rack 46 receives a fourth control signal 30D from the user through an IR emitter 58 which is electrically connected to an IR input-output port 60 of the controller 18 to select a particular audio device and selection. The selected audio rack device like 50, 52, 54 and 56 subsequently outputs left and right audio signals 48A-D, respectively, which are electrically transmitted to respective pluralities of audio input ports 42C-F of the controller 18.

The left and right audio signals 40A-B and 48A-D are electrically carried from the plurality of audio input ports 42A-F to one of two selected sections of the controller 18, a source selected zone output 68 or a pulse code modulator encoder 62. The source selected zone outputs simply route the analog audio signals to the appropriate location as will be discussed below. The encoder 62 converts the audio signals 40A-B and 48A-D into a digital pulse code modulation signal 64 which is electrically transmitted to the source transceivers like 12B or 12C. The encoding format of the digital information involves bits represented by pulses so that a description of an individual signal must include rise and fall times, pulse width or period, and the association of a single pulse with other pulses.

The controller 18 not only controls the selection of the audio device in the audio rack 46 but also directs the respective second communication signal 48 to the appropriate source transceiver like 12B. Preferably, with a plurality of source and zone transceiver pairs like 12A and 14A, a particular audio source can be heard in one or more locations in the facility. The controller 18 routes the audio signals from both the video and audio devices to the appropriate location, Preferably, the controller 18 provides sufficient input and output connections to simultaneously receive multiple communication signals, like first and second communication signals 22 and 48, and transmit those signals to one or more selected locations. Accordingly, the encoder 62 is electrically connected to all the source transceivers like 12B and 12C in the system where audio reception is desired.

The controller 18 has a modular configuration to adjust to the number and type of audio signal sources and remote locations serviced in the specific application. Accordingly, there are modules for audio input 66, source-selected zone output 68, digital zone output 70, and an IR repeater 72. Optional modules include, but are not limited to, low voltage relay 74 and a telephone/doorbell interface 76. Preferably, each of the modules is imprinted on a printed circuit card which allows selection of the desired features by plugging the card into a main chassis of the controller 18 at the factory or in the field. Each of the modules of the controller 18 will now be described.

The audio input module, generally designated as 66, includes quad source inputs like 78 and dual source inputs like 80. The plurality of audio inputs 42A-F for the left and right audio signals 40A-B and 48A-D are each quad source inputs 78. In total, there are ten stereo pairs illustrated in FIG. 1. Each of the quad source inputs 78 provides connection for up to four separate audio sources and each of the dual source inputs 80 provides for up to two separate audio sources. The dual source inputs 80 are preferably adapted for connecting to patch cords.

The source-selected zone output module, generally designated as 68, provides for selectively distributing the ten source inputs to ten different outputs. The ten outputs are provided by dual zone output cards like 82. Each dual zone output card 82 provides two stereo outputs 86A and 86B, and in-wall connections 88A and 88B, respectively for zones 1 and 2, The source selected zone output module 68 performs no signal conversion and instead routes the analog signals to the appropriate locations.

The digital zone output module, generally designated as 70, includes the encoder 62 as well as digital outputs 90A and 90B and IR inputs 92A and 92B for zones 1 and 2 respectively. The encoder 62 includes an analog/digital (A/D) converter and a line driver. Any one of the quad source inputs 78 and dual source inputs 80 can be electrically connected to the A/D converter via on-board multiplexers on the digital zone output circuit card. As a result, the audio signals like 40A-B and 48A-D are transmitted to the A/D converter which creates a CD formatted digital signal from any analog signals therein.

Examples of A/D converters suitable for use with the present invention are manufactured by the Crystal Semiconductor Company of Austin, Tex. under the catalog designations C85336-9. These A/D converters are CMOS devices which use delta-sigma modulation with 64X oversampling. The sampling rates are adjustable to 32 kHz, 44.1 kHz and 48 kHz. The analog-to-digital conversion is followed by linear phase digital filtering and decimation with a 0.01 B passband ripple and 80 dB stopband rejection which alleviates the need for external anti-aliasing filtering. The maximum output word rate is about 50 kHz per channel with a low power dissipation of 400 mW. These A/D converters are housed in a 0.6 inch wide 28-pin plastic DIP and also in a 0.3 inch wide 28-pin SOIC surface mount package. These A/D converters generate 16-bit values for both left and right inputs in serial form.

The serial form 16-bit values are transmitted to the line driver which encodes and transmits the values according to the AES/EBU interface standards. Examples of line drivers suitable for use with the present invention are manufactured by the Crystal Semiconductor Corporation under the catalog designations C88401-2. These line drivers are monolithic CMOS devices with a RS422 line driver located thereon. These line drivers accept audio and digital data which is multiplexed, encoded and driven directly, or through a transformer, onto a cable. The resultant serialized data signal in AES/EBU standard format is provided at the digital outputs 90A-B.

The IR repeater module 72 is electrically connected to the digital zone output module 70 and the source-selected zone output module 68 for relaying control signals therebetween. The IR repeater module 72 includes a plurality of IR output ports 94, like 38A and 38B, and IR input-output ports 96, like input-output port 60, discussed above.

The output ports 94 transmit control signals to audio or video devices. For example, a control signal is optically received from a remote location at the source transceiver like 12B or 12C. The control signal is electrically transmitted to the IR inputs 92A or 92B of the digital zone output module 70 which, in turn, repeats the control signal through the output ports 94 as the respective second or third control signals 30B or 30C to the video tuner 34 or VCR 44.

The IR input-output ports 96 receive and transmit control signals, For example, an operator uses the emitter 58 to generate the fourth control signal 30D and select the desired audio device in the audio rack 46. The operator also uses the emitter 58 to control which remote location or locations will receive the second communication signal 48 sent by the audio rack 46. The emitter 58 electrically transmits a fifth control signal 30E to the IR input-output port 96. In turn, the fifth control signal 30E is repeated to the digital zone output module 70 so that the desired second communication signal 48 is routed from the source selected zone output 68 to the appropriate output port 94.

The low voltage relay module 74 provides for connection to a maximum of six low voltage dry relay contacts which are used to control appliances (not shown) in remote locations. Pin pairs 98 are provided for each relay connection. The low voltage relay module 74 is also electrically connected to the IR repeater module 72 so that the operation of the individual pin pairs 98 is controlled remotely.

The telephone/doorbell interface module 76 provides for at least one phone input jack 100 for connection to telephone system (not shown). A phone output jack 102 provides for sending a paging signal to all or selected zone outputs. A doorbell input jack 104 provided for connection to one or more doorbells, A doorbell output jack 106 provides for sending a doorbell signal to speakers in all or selected zones for broadcasting one or more doorbell tones.

The controller 18 is connected to a conventional AC domestic power supply (not shown) by a plug connection 108 and controlled by an on/off switch 110. The controller 18 itself is grounded through port 112 and also provides an audio grounding port 114.

Figure 2A:
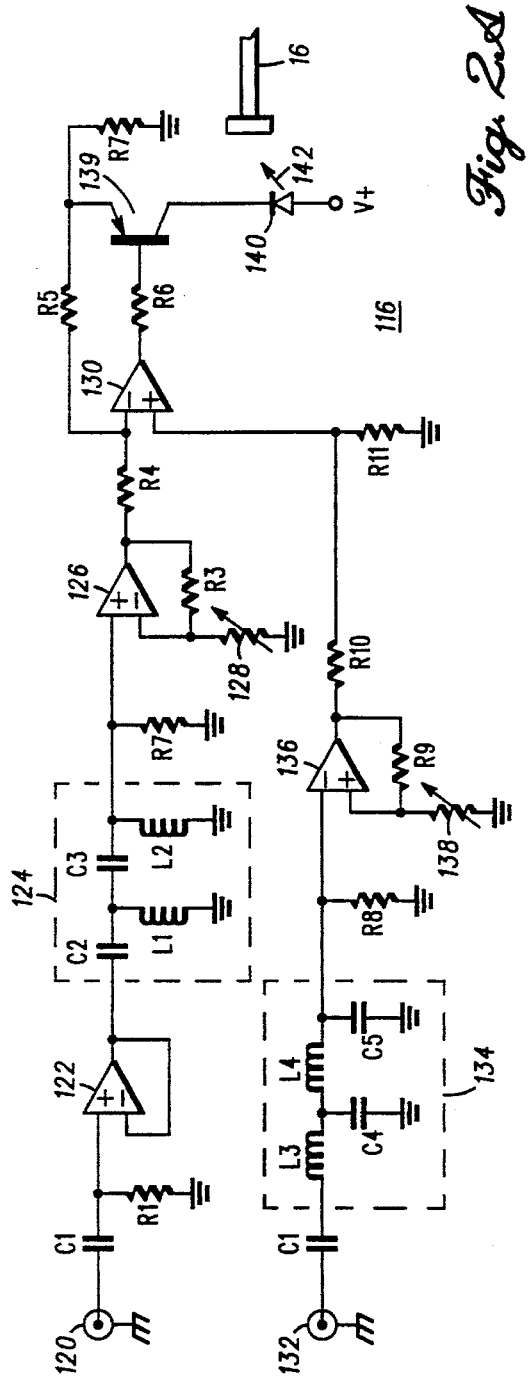
FIG. 2A is a circuit diagram used in a source transceiver which illustrates a preferred embodiment for converting a video or audio signal or both into a first lightwave signal.
Figure 2B:
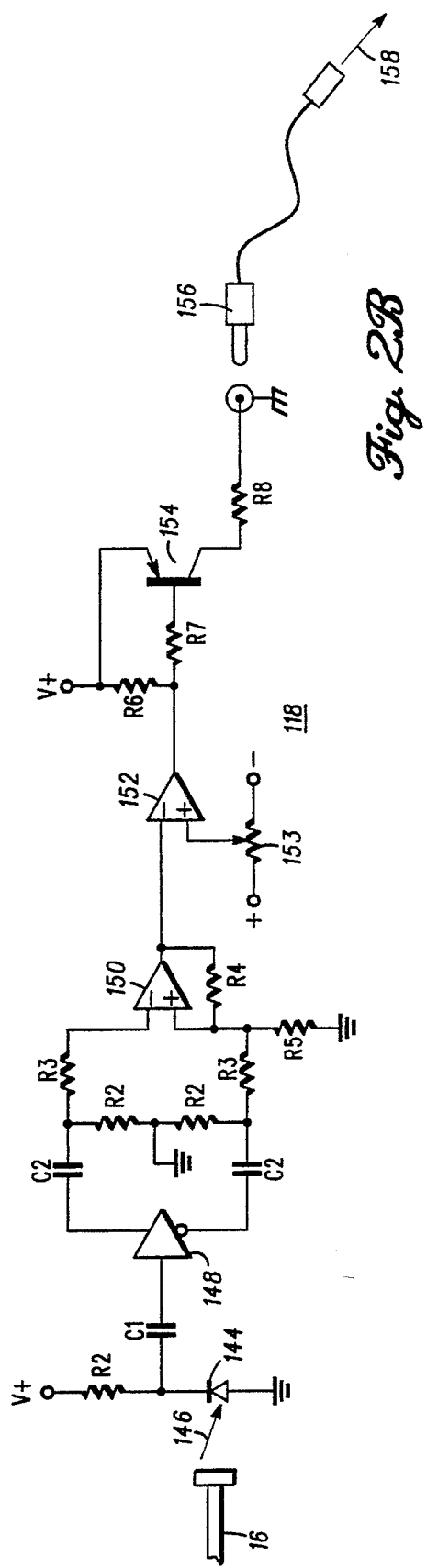
FIG. 2B is a circuit diagram used in a source transceiver which illustrates a preferred embodiment for converting a second lightwave signal into an electrical control signal.

A preferred embodiment of the source transceiver like 12A-N is illustrated in more detail by the source optical transmission circuit 116 and the source optical reception circuit 118 in FIGS. 2A and 2B, respectively. The source optical transmission circuit 116 receives and combines both the channel 3 or 4 AM video modulation signal 32A and the digital pulse code modulated signal 64 into a combined signal which is converted into a lightwave signal for transmission to the corresponding zone transceiver 14A-N, The source optical reception circuit 118 receives and converts a lightwave signal from the respective zone transceiver 12A-N into an IR output signal.

Referring to FIG. 2A, the source optical transmission circuit 116 receives the AM video modulation signal 32A at a first electrical input terminal 120 and then to a video amplification buffer 122. A conventional TL074-type operational amplifier or its equivalent is suitable with capacitor C1 and resistor R1 to buffer the signal 32A.

The signal 32A then enters a high pass filter 124 which passes all frequencies above a specified cut-off frequency. The frequency used for the AM video modulation signal in the preferred embodiment is about 60 to 66 mHz. Thus, the high pass filter 124 has a cut-off frequency of about 54 mHz. The high pass filter 124 helps eliminates distortion usually found in the lower frequency band. Typically, the cut-off frequency of the high pass filter 124 is the frequency at which the response is 3 dB below the reported insertion loss of the high pass filter. Above this frequency, the high pass filter operates in its passband and exhibits a low insertion loss. The passband is the desired band of frequencies in which the only loss is internal to the filter. Preferably, the present invention uses the type of high pass filter 124 with a multipole lumped-element configuration based on a conventional arrangement of capacitors and coils such as capacitors C2-3 and coils L1-2.

The signal 32A then passes through a video amplification circuit 126 with a potentiometer 128 for calibration gain adjustment. The video amplification circuit 126 is based upon a TL074-type operational amplifier or suitable substitute in combination with resistors R7, R3 and R4. The calibration gain adjustment controls the dynamic range and quality of the signal due to the lightwave transmitter 140 component variations. The output is then passed to a combiner 130 for combining with the digital pulse code modulated signal 64 in the manner described below.

The digital pulse code modulation signal 64 is transmitted to a second electrical input terminal 132 at the source transceiver 12A-N and then through a low pass filter 134. The frequency used for the digital code modulation signal 64 in the preferred embodiment is about 6 to 7 mHz. Thus, the low pass filter 134 has a cut-off frequency of about 7 mHz. The low pass filter 134 passes all frequencies below a specified cut-off and any signal above this frequency is attenuated. To achieve this effect, a conventional arrangement of capacitors C4-5 with coils L3-4 are used in combination with capacitor C1.

The signal 64 then passes through an operational amplifier circuit 136 connected with a potentiometer 138 for calibration gain adjustment. The use of a OP-64 operational amplifier or its equivalent is suitable for use in combination with resistors RS-11. The output is then passed to a combiner 130 which combines the AM video modulation signal 32 with the digital pulse code modulated signal 64 into one electrical signal.

Preferably, the combiner 130 is a OP-64 operational amplifier when coupled with the video amplification circuit 126 and operational amplifier circuit 136 which provide a balanced signal to the combiner 130 for further amplification. Other means for combining these signals into one balanced electrical output, like digital multiplexing equipment, are also suitable for use with the present invention.

The electrical output signal from the combiner 130 is connected to a driver circuit based on a transistor 139 and resistors R5-7. The electrical output signal is then directed to a lightwave transmitter 140. The lightwave transmitter 140 is optically connected to the optical carrier 16 for transmission of a first generated lightwave signal 142.

The lightwave transmitter 140 is a transducer that converts electrical input signals to lightwave energy output signals. This requires a source of light energy which in this embodiment is supplied by a light-emitting diode (LED). Although a laser diode couples more light into an optical carrier with a higher data transmission rate compared to an LED, the laser is considerably more expensive and complex. Suitable laser diodes include the distributed feedback (DAB) laser and the lower cost Fabry-Perot (FP) laser.

Since the present invention is primarily used within facilities, using a less expensive LED as the light source is preferred. An LED manufactured by the ATE Company of Irvine, Calif., under the catalog designation ATE X9003, is suitable. This LED is a high radiance GaAlAs IR LED optimized for the high power coupling of a variety of fibers with wide bandwidth operation. This LED has an operating temperature range of about −40 degrees C. to about 100 degrees C. The forward voltage of this LED at 50 mA is about 1.5 volts, the reverse voltage at 10 uA. is typically about 5.0 volts with a series resistance of about 2.0 Ohms and capacitance of about 70 picoFarads. The peak wavelength of this LED is about 850 nm, with a spectral bandwidth of about 50 nm. and an electrical bandwidth of about 80 MHz., all measured at 100 mA.

Referring now to FIG. 2B to illustrate the other components of the source transceiver's preferred embodiment, the source optical reception circuit 118 includes a lightwave receiver 144 which receives a second lightwave signal 146 delivered by the optical carrier 16. The second lightwave signal 146 is a control signal sent from the remote location in the facility to the controller 18 to select the desired communication signal. The generation of the control signal will be discussed in more detail below.

The lightwave receiver 144 is a transducer like a photodetector that converts light energy input to electrical energy output signals. The most common photodetectors are a positive-intrinsic-negative (PIN) diodes and avalanche photodiodes (APDs). Although the APDs are more responsive than PIN diode detectors, they are also considerable more complex and expensive. PIN diodes typically have a photon-to-electron conversion gain of one or less. This is normally sufficient to detect the signals from a LED over the short optical carrier lengths in the facilities utilizing the present invention. Since the PIN diodes are inexpensive and still provide a reliable, long operating life with adequate responsiveness, their use with the present invention is preferred.

A suitable lightwave transmitter 140 is a high speed photodiode manufactured by the ATE Company with the catalog designation ATE RM65. This photodiode is designed for operation in the 850 nm range with a full range of 400 nm to 1000 nm and has a frequency response of about 100 MHz. The operating voltage of this photodiode is about 30 volts with a risetime of 3.5 ns, a typical response time of 0.55 A/W, and a noise equivalent power of $3.3 \times 10^{-14}$ WHz$^{-1/2}$ at 900 nm.

The reception circuit 118 processes the electrical control signal output of the lightwave receiver 144 by amplifying, pulse reshaping, or effecting current-to-voltage conversions such that the electrical output is compatible with other equipment in the system. To ensure adequate detection, the signal level of the second lightwave signal 146 is preferably at least twice the inherent lightwave receiver 144 noise current. To reduce the effect of noise, a conventional transimpedance amplifier circuit 148 or emitter driver receives the electrical output of the lightwave receiver 144 with capacitor C1 and resistor R2. The electrical output is then amplified by an operational amplifier 150 such as a TL074-type amplifier connected with capacitors C2 and resistors R2-5.

The amplified electrical output is then directed to a comparator circuit 152 based on a TL074-type operational amplifier for comparing the amplified control signal to an adjustable threshold represented by potentiometer 153. With a pre-determined sensitivity setting, the comparator circuit 152 converts the analog signal to a sharp edged digital signal. Subsequently, the electrical output is forwarded through a conventional transistor circuit 154 and arrangement of resistors R6-8.

A Video Link IR Receiver 156 receives and converts the electrical output from the transistor circuit 154 to transmit an IR control signal 158 to IR inputs like 92A of the controller 18. Preferably, the video link 156 is an IR emitter like model 282-00 manufactured by the Video Link Company of Sylmer, CO. The video link 556 is a standard 100 ma emitter containing a IR LED mounted in a plastic housing.

The present invention contemplates the use of other means for receiving at least one communication signal, for converting the communication signal into the first lightwave signal, for receiving the second lightwave signal, and for converting the second lightwave signal into the control signal. Suitable terminal equipment for the source transceiver includes, but is not limited to, a wavelength division multiplexer. This frequency discriminating device permits the use of two or more lightwave signals of different wavelength to be carried on the same optical carrier. Terminal equipment which responds to only one discrete wavelength of light energy is both expensive and complex. The frequency discrimination or isolation is usually provided external to the receiver itself. Thus, the use of inexpensive devices for focusing, filtering, collimating, or otherwise handling of the lightwave signals for receiving and transmitting between the ends of an optical carrier is the primary contemplation of the present invention.

Figure 3A:
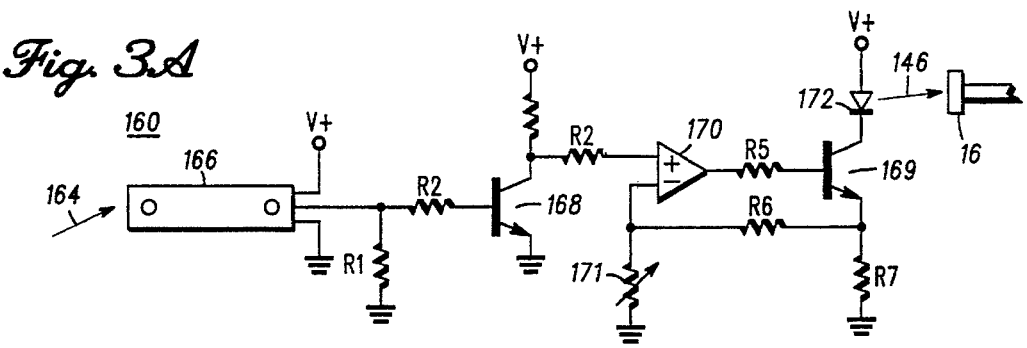
Figure 3B:
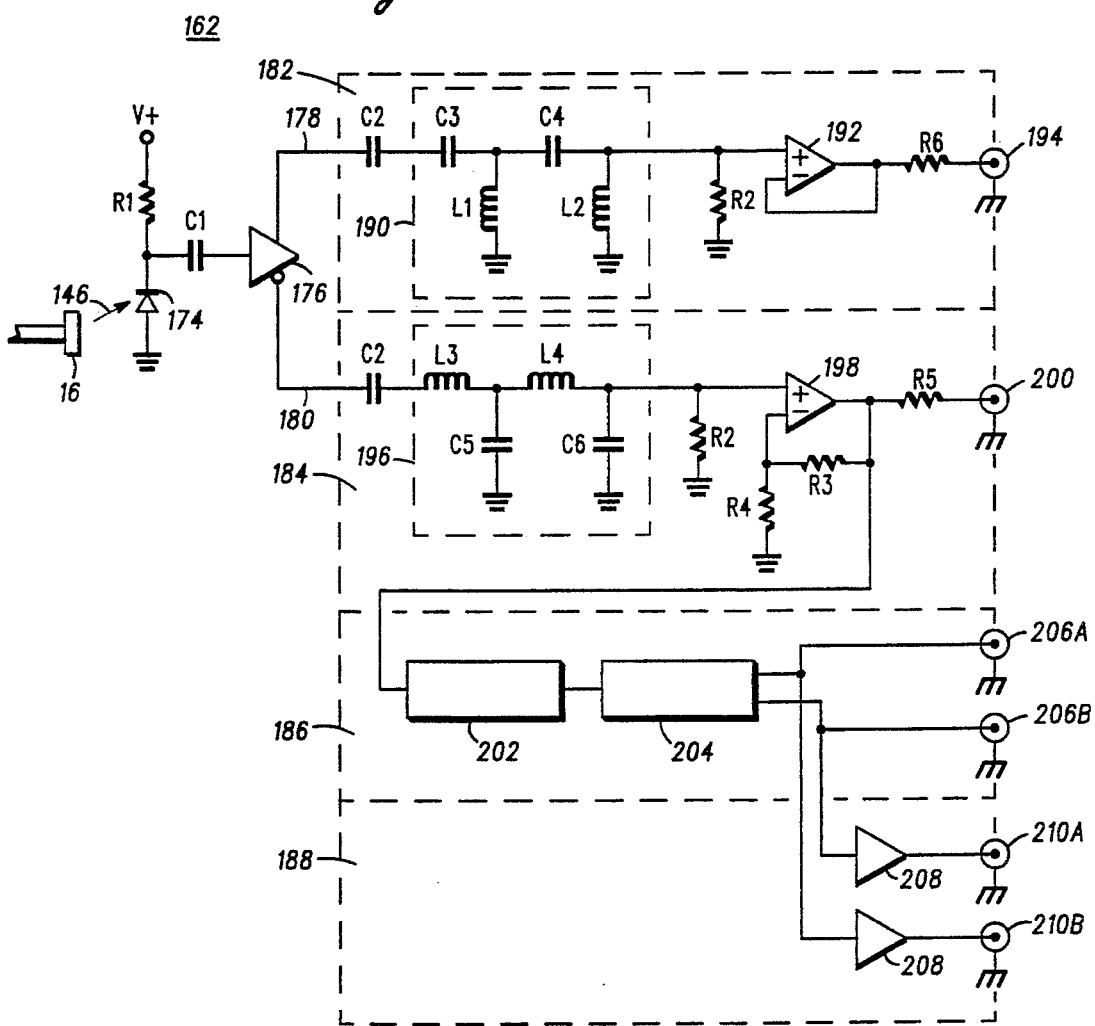

A preferred embodiment of the zone transceiver like 14A-N is illustrated in more detail by the zone optical transmission circuit 160 and zone optical reception circuit 162 in FIGS. 3A and 3B, respectively. The zone optical reception circuit 162 receives and converts the first lightwave signal 142 into an electrical signal which is then separated into the AM video modulation signal 32A and the digital pulse code modulation signal 64 of FIG. 1. The zone optical transmission circuit 160 receives an IR control signal which is converted into the second lightwave signal 146 for optical transmission to the corresponding source transceiver 12A-N.

Referring to FIG. 3A, the zone optical transmission circuit 160 receives an IR control signal 164 at a Video Link IR Receiver 166 which converts the IR control signal to an electrical output. Preferably, the video link 166 is an inexpensive IR receiver like the model 480-00 Dinky Link manufactured by the Video Link Company. This video link has a nominal reception range of less than 30 feet, a reception angle of 55 degrees off axis and operates in an IR modulation frequency bandwidth of about 30 to about 100 kHz. The maximum current output is 100 mA. and is powered by 10 mA at 12 volts DC.

The electrical output of the Video Link IR Receiver 166 is directed through a buffer circuit based on transistor 168 with resistors R1-2 to a conventional driver circuit 170 based on a TL074-type operational amplifier or its equivalent. The driver circuit adjusts the modulation of the electrical output with potentiometer 171, a transistor 169 and resistors R5-7 to compensate for LED device variations.

The amplified electrical output is connected to a zone lightwave transmitter 172. The lightwave transmitter 172 is optically connected to the optical carrier 16 for transmission of the second generated lightwave signal 146. As previously described, an LED manufactured by the ATE Company under the catalog designation ATE X9003 is suitable.

Referring now to FIG. 3B, the zone optical receiver circuit 162 includes a zone lightwave receiver 174 which receives the first lightwave signal 142 delivered by the optical carrier 16. The first lightwave signal 142 carries the AM video modulation signal 32 or the digital pulse code modulation signal 64 or both in lightwave rather than electrical form.

The zone lightwave receiver 174 converts the first lightwave signal 142 into an electrical output as previously disclosed in reference to the source receiver circuit 118. The electrical output is directed to a transimpedance amplifier 176 and the amplified electrical output is split into two distinct components 178 and 180. A suitable transimpedance amplifier 176 is an amplifier or its equivalent used in combination with resistor R1 and capacitor C1.

One of the advantages of the present invention is demonstrated by the description of the modular design of the zone transceivers 14A-N that follows. The cost of the present invention is made more affordable by allowing the zone transceivers 14A-N to be configured to the particular needs of the remote location. Accordingly, examples of modules and their outputs for servicing the particular needs at a remote location include a video module 182, a digital audio module 184, a linelevel analog audio module 186, and a speaker analog audio module 188.

The first component 178 of the split electrical output enters the video module 182 through a zone high pass filter 190 using capacitors C3-4 and coils L1-2 in combination with capacitor C2 which pass all frequencies above a specified cut-off frequency in the manner previously described. The frequency used for the AM video modulation signal in the preferred embodiment is about 60 to 66 mHz. Thus, the zone high pass filter 190 has a cut-off frequency of about 54 mHz and isolates the first component of the electrical output as the AM video modulated signal 32. Other means are contemplated by the present invention for isolating the individual components of the converted first lightwave signal 142.

The AM video modulation signal 32 then passes through a video amplification buffer 192 based on a conventional OP-64 operational amplifier used in combination with resistors R2 and R6 which amplifies the signal. The AM video modulation signal 32 is then directed to an electrical output terminal 194 of the video module 182.

The second component 180 of the electrical output split by the transimpedance amplifier 176 is directed to the digital audio module 184 through a zone low pass filter 196. The frequency used for the digital code modulation signal 64 in the preferred embodiment is about 6 to 7 mHz. Thus, the zone low pass filter 196 has a cut-off frequency of about 7 mHz. The low pass filter 196 passes all frequencies below a specified cut-off and any signal above this frequency is attenuated so that the second component of the electrical signal is isolated as the digital pulse code modulation signal 64. Other means are contemplated by the present invention for isolating the individual components of the converted first lightwave signal 142. Alternately, a bandpass filter can be used for the low pass filter 196.

The digital pulse code modulation signal 64 then passes through an amplification circuit 198 based upon a TL074-type operational amplifier or suitable substitute used in combination with resistors R2-5. The digital pulse code modulation signal 64 which is the output of the digital audio module 184 is then passed to a second electrical output terminal 200.

The linelevel analog module 186 can receive the digital pulse code modulation signal 64 for conversion into an analog signal for linelevel outputs. The digital pulse code modulation signal 64 is directed to a line receiver 202 which decodes the values according to the AES/EBU interface standards and transmits a digital output. Examples of line receivers suitable for use with the present invention are manufactured by the Crystal Semiconductor Corporation under the catalog designations CS8411-2. These line receivers are monolithic CMOS devices with a RS422 receiver located thereon. These line receivers accept audio and digital data which is encoded according to the AES/EBU interface standard, recovers the clock and synchronization signals and de-multiplexes the audio and digital data. The resultant 16-bit serialized digital signal is provided to a digital/analog (D/A) converter 204.

An example of the D/A converter 204 suitable for use with the present invention is manufactured by the Crystal Semiconductor Company of Austin, Tex. under the catalog designations CS4328. This D/A converter is a CMOS device which uses an 8X digital interpolation filter followed by delta-sigma modulation with 64X oversampling, The sampling rates are adjustable to 32 kHz, 44.1 kHz and 48 kHz. The digital-to-analog stereo conversion is followed by low pass filtering providing a linear phase response with a 0.001 dB passband ripple and 95 dB dynamic range over the audio band. This D/A converter generates linelevel outputs for both left and right stereo signals 206A and 206B respectively.

The speaker analog module 188 can receive the left and right linelevel analog signals for conversion into an analog signal formatted for speaker outputs. The left and right linelevel analog signals 206A-B are each directed to a separate amplifier 208 of conventional design which amplifies the signals for direct use by conventional speakers and transmits the speaker analog output to terminals 210A and 210B respectively.

The preferred electrical performance for the terminal equipment like source and zone transceivers 12A and 14A include a number of parameters primarily concerned with noise and distortion because of the AM transmission mode utilized by the present invention. The carrier-to-noise ratio (CNR) is about 56 dB. The CNR will vary not only with channel loading but also with optical loss over the transmitted distance. There is a frequency response of about 17 mHz to about 70 mHz. The chrominance to luminance delay is about 5 nm/second. The composite second order and triple beat disturbances are less than 56 dBc as expressed relative to the carrier and at a fixed channel loading on the fiber. Since a system can be optimized for the highest CNR or the lowest distortion, the CNR and distortion performance numbers are given at the same LED diode depth of modulation. The differential gain error is about 2 percent and the differential phase error is about 2 degrees.

The present invention contemplates the use of other means for converting the first lightwave signal into the communication signal, for accessing the communication signal at each of the locations distributed throughout the facility, for receiving the control signal at one of the remote locations, and for converting the control signal into the second lightwave signal. Again, a wavelength division multiplexer is suitable terminal equipment for the zone transceiver. Other inexpensive devices are also suitable for handling the lightwave signals and for receiving the control signal from an optical emitter.

Preferably, the optical carrier 16 between the source transceivers 12A-N and the zone transceivers 14A-N described above is a dual multimode optical fiber. The fiber provides transmission of a lightwave signal as light energy propagating through the fibers. The propagation is multimode in nature since there are a multiplicity of transmission paths or modes of a given wavelength through the fibers.

A dual fiber is used between each source and zone transceiver pair like 12A, 14A in order to lower the cost and simplify the type of terminal equipment on each of the fibers. Each part of the dual fiber sends a lightwave signal in one directional only.

It is suitable to use only one fiber as the optical carrier 16 between each source and zone transceiver like 12A, 14A since optical fiber can transmit lightwave signals in both directions. A bidirectional system, however, uses receiving and transmitting equipment which must discriminate between the two lightwave signals using the same fiber. The costs increase dramatically and far exceed the cost of using distinct, unidirectional fibers. As discussed herein, other optical devices such as the wavelength division multiplexer can be utilized in a bidirectional system.

Preferably there are no splices in the carrier 16 between each source and zone transceiver like 12A, 14A. Any splice will introduce some transmission loss of the wavelight signal. Pre-determined lengths of fiber sufficient to reach through the facility are used so that the ends of the fiber can be pre-terminated for connection to the transceivers.

A typical arrangement for connecting a source and zone transceiver like 12B and 14B includes the carrier 16 having one fiber connected to receive the first lightwave signal 142 from the source lightwave transmitter 140. The opposite end of the fiber delivers the first lightwave signal 142 to the zone lightwave receiver 174. The second fiber of the carrier 16 receives the second lightwave signal 146 from the zone lightwave transmitter 172 for delivery to the source lightwave receiver 144.

An example of a preferred carrier 16 is the dual fiber is sold by the Ensign-Bickford Optics Company of Avon, Conn., designated as Zipcord HCP-M0200T-J02VZ. This dual fiber is made of hard clad silica with a PVC jacket. The diameter of each individual fiber is about 2.2 mm and comes in various pre-terminated lengths. This fiber exhibits a nominal bandwidth of 17 MHz-km and low loss specifications are 200 µm for the core and 230 µm for the cladding. The preferred lengths of the fibers are about 200 feet maximum with optional 50 foot and 100 foot lengths for other connections. The fibers are pre-terminated to avoid intermediate splices between the terminal equipment.

Standard mating connectors are used as the input and output terminals to the terminal equipment. For example, a BNC style connector and Weidmuller 12591.6 adapter can be used. Several options are suitable as the optical connectors including ST, SMA and FC designated connectors.

Other equipment suitable for use with the present invention is described in "Understanding Lightwave Transmission: Applications Of Fiber Optics," by William O. Grant, published by Harcourt Brace Jovanovich, 1988, ISBN#: 0-15-592874-0. The entire teaching and disclosure of this publication is incorporated herein by reference.

Typical examples of how the present invention operates and can be modified to service the particular needs of a remote location will now be described. Referring to FIG. 1, a first remote location or room 212 contains a television 214. To provide service to the television 214, the hand held remote 216 sends an IR signal like 164 to the zone transceiver 14A which converts the IR signal 164 through transmitter circuit 160 described in FIG. 3A into a second lightwave signal like 146.

The carrier 16 connects the second lightwave signal 146 to the corresponding source transceiver 12A. Through receiver circuit 118 described in FIG. 2B the second lightwave signal 148 is converted to an IR control signal like 158. The IR emitter 36 receives the IR control signal 158 and directs the cable converter 26 to select the appropriate channel.

The selected channel is carried as an AM video modulation signal like 32A to the source transceiver 12A. Source transmitter circuit 116 described in FIG. 2A converts the AM video modulation signal 32A into a first lightwave signal like 142 which is carried to the zone transceiver 14A by the carrier 16. Zone receiver circuit 162 converts the first lightwave signal 142 through the video module 182 to deliver the AM video modulation signal 32A to the television 214. Conventional televisions contain built-in automatic gain control circuits which allows to the present invention to eliminate an expensive automatic gain control circuit in the video module 182.

Another example is provided by the second remote location illustrated as room 218 which contains a video monitor 220 and conventional speakers 222. To provide service to the television 220, the hand held remote 224 sends an IR signal like 164 to a Video Link IR Receiver like 166 mounted on the video monitor 220. The IR signal 164 is electrically transmitted to the zone transceiver 14A which converts the IR signal 164 through transmitter circuit 160 described in FIG. 3A into a second lightwave signal like 146.

The carrier 16 connects the second lightwave signal 146 to the corresponding source transceiver 12B. Through receiver circuit 118 described in FIG. 2B the second lightwave signal 146 is converted to an IR control signal like 158. The controller 18 receives the IR control signal 158 at IR input port 92A and directs the video tuner 34 to select the appropriate channel through a first control signal 30A sent from the output port like 94 on the IR repeater module 72.

The selected channel is carried as an AM video modulation signal like 32B to the source transceiver 12B. Source transmitter circuit 116 described in FIG. 2A converts the AM video modulation signal 32B into a first lightwave signal like 142 which is carried to the zone transceiver 14B by the carrier 16. Zone receiver circuit 162 converts the first lightwave signal 142 through video module 182 to deliver the AM video modulation signal 32B to the video monitor 220.

The control signal 158 also directs the left and right audio signals 40A from the video tuner 34 to the audio input module 66 and through the digital zone output module 70 to output a digital pulse code modulation signal like 64 from port 90A. The digital pulse code modulation signal 64 is directed to the source transceiver 12B. Source transmitter circuit 116 described in FIG. 2A combines the AM video modulation signal 32B with the digital pulse code modulation signal 64 and converts the combined signal into the first lightwave signal like 142 which is carried to the zone transceiver 14B by the carrier 16. Zone receiver circuit 162 converts the first lightwave signal 142 through speaker analog audio module 188 to deliver an analog audio signal formatted for speakers 222.

A further example is provided by a third remote location illustrated as room 226 in FIG. 1 which contains a high power amplifier 228 and large speakers 230. The hand held remote 232 sends an IR signal like 164 to the zone transceiver 14C which converts the IR signal 164 through transmitter circuit 160 described in FIG. 3A into a second lightwave signal like 146.

The carrier 16 connects the second lightwave signal 146 to the corresponding source transceiver 12C. Through receiver circuit 118 described in FIG. 2B the second lightwave signal 146 is converted to an IR control signal like 158. The controller 18 receives the IR control signal 158 at IR input port 92B and directs the audio rack 46 to select the appropriate audio device and channel through a fifth control signal 30E sent from one of the input-output ports 96 on the IR repeater module 72.

The selected audio device like CD player 50 directs the left and right audio signals 48A to the audio input module 66 and through the digital zone output module 70 to output a digital pulse code modulation signal like 64 from port 90B. The digital pulse code modulation signal 64 is directed to the source transceiver 12C. Source transmitter circuit 116 described in FIG. 2A converts the digital pulse code modulation signal 64 into the first lightwave signal like 142 which is carried to the zone transceiver 14C by the carrier 16. Zone receiver circuit 162 converts the first lightwave signal 142 through linelevel analog audio module 186 to deliver an analog audio signal formatted for the high power amplifier 228 and large speakers 230.

In the preferred embodiment, the fiber frequency allocation and modulation format includes using the infrared control signal between about 30 kHz and 100 kHz. The vestigial sideband AM modulated signal bandwidth is 6.0 mHz. This vestigial sideband AM modulation signal is centered between about 60 mHz and 66 mHz, The television FM sound carrier is at about 65.75 mHz. The AES/EBU standard digital audio data is carried on the audio/video spectrum below about 1.4 mHz.

As those skilled in the art can appreciate, there is a clearly defined demarcation point at the electrical interface with either a light receiver or transmitter. The nature of the electronic terminal equipment external to the light transmitter and receiver may determine the functions required by these units. It may be necessary to convert the electrical output of the terminal equipment to some more suitable electrical format before extending the signal to any external electrical equipment. Substituting other terminal equipment for that described herein may similarly require a substitution or elimination of the auxiliary equipment.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A distribution system for providing a user access and control of communication signals at various locations within a facility from audio and video sources external to the system, the system comprising:

first converting means for receiving at least one communication signal having an audio or video portion or both, for converting the communication signal into a first lightwave signal, for receiving a second lightwave signal, and for converting the second lightwave signal into a control signal;

second converting means for converting the first lightwave signal into the at least one communication signal, for accessing the at least one communication signal at each of the locations distributed throughout the facility remote to the first converting means, for receiving the control signal at one of the remote locations, and for converting the control signal into the second lightwave signal;

an optical carrier optically connecting the first and second converting means and carrying the first and second lightwave signals therebetween; and means for controlling the selection of the at least one communication signal in response to the control signal, the controlling means being adapted for receiving the at least one communication signal and electrically connected to the first converting means for receiving the control signal therefrom and for sending the at least one communication signal thereto.

2. The system of claim 1 wherein the first converting means includes a source transceiver, the source transceiver having means for combining an AM video modulation signal from a first communication signal source and a pulse code audio modulation signal from a second communication signal source into an electrical signal and directing the electrical signal into a lightwave transmitter, the combiner electrically connecting to the first and second communication signal sources, the lightwave transmitter converting the electrical signal from the combiner into the first lightwave signal, the lightwave transmitter optically connecting to the optical carrier and electrically connecting to the combining means, the source transceiver having a lightwave receiver for receiving the second lightwave signal and converting the second lightwave signal into the control signal, the lightwave receiver optically connecting to the optical carrier and electrically connecting the controlling means.

3. The system of claim 1 wherein the second converting means includes a zone transceiver for each location, the zone transceiver having a zone lightwave receiver optically connecting to the optical carrier and converting the first lightwave signal into an electrical signal, the zone lightwave receiver electrically connecting to means for isolating an AM video modulation signal and a pulse code audio modulation signal from the electrical output and respectively directing the AM video modulation signal and the pulse code audio modulation signal to a first and a second communication signal output, the zone transceiver having a zone lightwave transmitter for receiving the control signal and converting the control signal into the second lightwave signal, the zone lightwave transmitter optically connecting to the optical carrier and optically connecting to an optical emitter at the location.

4. The system of claim 3 wherein the first communication signal output being adapted for electrical connection to a video display.

5. The system of claim 3 wherein the second communication signal output being adapted for connection to an audio speaker.

6. The system of claim 1 wherein the optical carrier is a multimode fiber.

7. The system of claim 1 wherein the controlling means includes a converter being adapted to receive a multi-channel audio/video communication signal from a first source external to the system and for selecting and converting one channel of the communication signal to an AM video modulation signal, the converter electrically connecting to the first converting means for transmitting the AM video modulation signal thereto and receiving the control signal therefrom and adapted to electrically connect to the first external source.

8. The system of claim 7 wherein the controlling means includes a plurality of converters corresponding to the number of remote locations, each converter adapted for electrically connecting to the external source of the first communication signal.

9. The system of claim 1 wherein the controlling means includes a controller having:
- a plurality of electrical inputs adapted to receive a plurality of audio communication signals from a second source external to the system and the control signal from the first converting means;
- an encoder for converting one audio communication signal into a standard audio format;
- a plurality of electrical outputs for electrically transmitting the formatted audio communication signal to the first converting means; and
- adapted to electrically connect to the second external source.

10. A transceiver for a centralized source within a facility which provides a user access and control of communication signals transmitted through an optical carrier to remote locations within the facility, the transceiver comprising:
- a housing having openings therein for electrical and optical terminal connections;
- converting means for receiving at least one communication signal having an audio or video portion or both, for converting the at least one communication signal into a first lightwave signal, for receiving a second lightwave signal, and for converting the second lightwave signal into a control signal;
- at least one optical terminal being adapted for connection to the optical carrier, the optical terminal transmitting the first lightwave signal and receiving the second lightwave signal;
- an electrical input terminal for receiving the at least one communication signal; and
- an electrical output terminal for outputting the control signal.

11. The transceiver of claim 10 wherein the electrical input terminal includes:
- a first electrical input terminal being adapted to receive an AM video modulation signal from a first communication signal source;
- a second electrical input terminal being adapted to receive a pulse code audio modulation signal from a second communication signal source; and
- means for combining the AM video modulation signal and the pulse code audio modulation signal into an electrical signal, the combining means electrically connecting to the first and second electrical input terminals; and
the converting means includes:
- a lightwave transmitter receiving and converting the electrical signal from the combining means into the first lightwave signal, the lightwave transmitter connecting to a first optical terminal for transmitting the first lightwave signal to the optical carrier and electrically connecting to the combining means; and
- a lightwave receiver being adapted to receive the second lightwave signal from the optical carrier and converting the second lightwave signal into the control signal, the lightwave receiver connecting to a second optical terminal and electrically connecting to the second electrical output terminal.

12. The transceiver of claim 11 wherein the transceiver further includes a high pass filter for removing distortion in the AM video modulation signal, the high pass filter electrically connecting to the first electrical input terminal and the combining means.

13. The transceiver of claim 11 wherein the transceiver further includes a low pass filter for removing distortion in the pulse code modulation signal, the low pass filter electrically connecting to the second electrical input terminal and the combining means.

14. The transceiver of claim 11 wherein the light transmitter is a light emitting diode.

15. The transceiver of claim 11 wherein the light receiver is a photodiode.

16. A transceiver for remote locations within a facility which provides a user access and control of communication signals transmitted through an optical carrier from a centralized source, the transceiver comprising:
- a housing having openings therein for electrical and optical terminals;
- converting means for converting a first lightwave signal into at least one communication signal having an audio or video portion or both, for accessing each communication signal at the remote location, for receiving a control signal at the remote location, and for converting the control signal into a second lightwave signal;
- at least one optical terminal being adapted for connection to the optical carrier, the optical terminal transmitting the second lightwave signal and receiving the first lightwave signal;
- an electrical output terminal for outputting the at least one communication signal; and
- an input terminal for receiving the control signal.

17. The transceiver of claim 16 wherein the converting means includes:
- a lightwave transmitter receiving and converting the electrical signal from the input terminal into the second lightwave signal, the lightwave transmitter connecting to a first optical terminal for transmitting the second lightwave signal to the optical carrier and electrically connecting to the input terminal; and
- a lightwave receiver adapted to receive the first lightwave signal from the optical carrier and converting the first lightwave signal into an electrical signal, the lightwave receiver connecting to a second optical terminal and electrically connecting electrical output terminal to direct the electrical signal thereto; and
the electrical output terminal includes:
- means for isolating an AM video modulation signal from a first communication source and a pulse code audio modulation signal from a second communication in the electrical signal, the isolating means electrically connecting to the first and second electrical output terminals;
- a first electrical output terminal for receiving the AM video modulation signal and a second electrical output terminal for receiving a pulse code audio modulation signal from the isolating means.

18. The transceiver of claim 17 wherein the isolating means includes a high pass filter for isolating the AM video modulation signal in the electrical signal, the high pass filter electrically connecting to the first electrical output terminal and the lightwave receiver.

19. The transceiver of claim 17 wherein the isolating means includes a low pass filter for isolating the digital pulse code modulation signal in the electrical signal, the low pass filter electrically connecting to the second electrical output terminal and the lightwave receiver.

20. The transceiver of claim 19 wherein the isolating means further includes a digital-to-analog converter and a line receiver to convert the digital pulse code modulation signal to a linelevel analog audio signal, the digital-to-analog converter and line receiver being electrically connected in series to the low pass filter and the second electrical output.

21. The transceiver of claim 20 wherein the isolating means further includes an amplifier to convert the linelevel analog audio signal into an analog audio signal formatted for speakers.

22. The transceiver of claim 17 wherein the light transmitter is a light emitting diode.

23. The transceiver of claim 17 wherein the light receiver is a photodiode.

24. A controller for providing a user access and control of communication signals at various locations within a facility from audio sources external to the controller, the controller comprising:

a plurality of electrical inputs adapted to receive a plurality of audio communication signals and a control signal;

an encoder for converting one audio communication signal into a standard audio format;

a plurality of electrical outputs for electrically transmitting the formatted audio communication signal; and means for electrically directing the formatted audio communication signal to the selected electrical output in response to the control signal.

25. The controller of claim 24 wherein the encoder includes a analog-to-digital converter and a line driver electrically connected in series between the electrical inputs and outputs, the analog-to-digital converter and line driver converting the audio communication signal into a digital pulse code modulation signal.

26. The controller of claim 24 wherein the controller further includes an IR repeater module for receiving and transmitting the control signal to the selecting means and adapted to electrically transmit the control signal to devices external to the controller.

27. The controller of claim 24 wherein the controller further includes a telephone/doorbell interface module adapted for connection to a telephone and doorbell external to the system to receive an audio signal therefrom and direct the audio signal to the desired location in response to the control signal.

28. The controller of claim 24 wherein the controller further includes a low voltage relay module adapted for connection to appliances external to the controller and electrically connected to the control signal for operating the appliances in response thereto.

* * * * *